(12) United States Patent
Akahori

(10) Patent No.: US 9,172,575 B2
(45) Date of Patent: Oct. 27, 2015

(54) CORRELATOR AND DEMODULATION DEVICE INCLUDING CORRELATOR

(75) Inventor: Hiroji Akahori, Tokyo (JP)

(73) Assignee: LAPIS Semiconductor Co., Ltd., Yokohama (JP)

( * ) Notice: Subject to any disclaimer, the term of this patent is extended or adjusted under 35 U.S.C. 154(b) by 265 days.

(21) Appl. No.: 13/211,896

(22) Filed: Aug. 17, 2011

(65) Prior Publication Data

US 2012/0051472 A1    Mar. 1, 2012

(30) Foreign Application Priority Data

Aug. 30, 2010 (JP) ................. 2010-192451

(51) Int. Cl.
  *H04L 27/06* (2006.01)
  *H04L 27/26* (2006.01)

(52) U.S. Cl.
  CPC ........ *H04L 27/2663* (2013.01); *H04L 27/2691* (2013.01)

(58) Field of Classification Search
  CPC .............. H03D 1/00; H04J 1/01; H04J 11/00; H04L 7/00; H04L 27/01; H04L 27/06; H04L 27/2663; H04L 27/2691; H04B 1/69; H04B 1/707; H03K 9/00; H04K 1/10
  USPC ......... 370/203, 210, 260, 328, 335, 338, 343, 370/344, 350, 441, 467, 503, 206, 517; 375/232, 260, 267, 316, 334, 340, 375/343–346, 348, 350, 354, 375, 150, 152, 375/141, 147, 254; 455/43, 74.1, 110, 455/114.2, 513; 348/725, 726, 731
  See application file for complete search history.

(56) References Cited

U.S. PATENT DOCUMENTS 5,602,835 A * 2/1997 Seki et al. ............... 370/206
6,111,919 A   8/2000 Yonge, III
(Continued)

FOREIGN PATENT DOCUMENTS

JP   09-321733 A   12/1997
JP   11-163824 A   6/1999
(Continued)

OTHER PUBLICATIONS

An Office Action ; "Notice of Reasons for Rejection," issued by the Japanese Patent Office on Jun. 3, 2014, which corresponds to Japanese Patent Application No. 2010-192451 and is related to U.S. Appl. No. 13/211,896; with English language translation.

*Primary Examiner* — Sam K Ahn
*Assistant Examiner* — Shawkat M Ali
(74) *Attorney, Agent, or Firm* — Studebaker & Brackett PC

(57) ABSTRACT

The present invention provides a correlator and a demodulation device including, first and second filter sections having different non-overlapping pass-frequency characteristics, first and second delay circuits that delay the signals output from the first and second filter section by one effective OFDM symbol period, first and second complex conjugate circuits that take the complex conjugates of the delayed signals, first and second complex operation sections that compute the complex-multiplies of the signals from the first and second filter sections and the respective signals for the first and second complex conjugate circuits, first and second moving average processing sections that take moving averages of GI lengths, proportion determination circuit that compares the maximum values of the autocorrelations from each of the first and second moving average processing circuits, and selection-combination circuit that selects the autocorrelation having the largest maximum value based on the comparison result.

9 Claims, 10 Drawing Sheets

(56) References Cited

U.S. PATENT DOCUMENTS

| | | | |
|---|---|---|---|
| 8,411,807 B1* | 4/2013 | Rangarajan et al. | 375/343 |
| 2003/0117943 A1* | 6/2003 | Sakata et al. | 370/210 |
| 2003/0141949 A1* | 7/2003 | Couet | 334/23 |
| 2004/0247044 A1* | 12/2004 | Matsushita et al. | 375/316 |
| 2007/0211835 A1 | 9/2007 | Inagawa et al. | |
| 2008/0095280 A1 | 4/2008 | Akahori | |
| 2009/0074117 A1* | 3/2009 | Fujita et al. | 375/343 |
| 2009/0129457 A1* | 5/2009 | Akahori | 375/232 |
| 2009/0304136 A1 | 12/2009 | Kondo | |
| 2010/0061493 A1* | 3/2010 | Takahashi et al. | 375/343 |
| 2010/0283903 A1* | 11/2010 | Belotserkovsky | 348/725 |
| 2010/0303179 A1 | 12/2010 | Inagawa et al. | |

FOREIGN PATENT DOCUMENTS

| | | |
|---|---|---|
| JP | 2000-059332 A | 2/2000 |
| JP | 2001-144726 A | 5/2001 |
| JP | 2002-280997 A | 9/2002 |
| JP | 2002-535919 A | 10/2002 |
| JP | 2007-006328 A | 1/2007 |
| JP | 2007-181161 A | 7/2007 |
| JP | 2007-243622 A | 9/2007 |
| JP | 2008-109174 A | 5/2008 |
| JP | 2009-302687 A | 12/2009 |

* cited by examiner

RELATED ART

CORRELATOR AND DEMODULATION DEVICE INCLUDING CORRELATOR

CROSS-REFERENCE TO RELATED APPLICATION

This application claims priority under 35 USC 119 from Japanese Patent Application No. 2010-192451, filed on Aug. 30, 2010, the disclosure of which is incorporated by reference herein.

BACKGROUND OF THE INVENTION

1. Field of the Invention

The present invention relates to a correlator that determines the correlation between an OFDM signal, which has an effective symbol period and a guard interval in which part of the effective symbol signal has been copied, and a delay signal obtained by delaying the OFDM signal. The present invention also relates to a demodulation device that includes the correlator. The present invention in particular relates to a correlator and a demodulation device including the correlator, capable of deriving autocorrelation from which influence of undesired power has been removed even when undesired power is incorporated in the received signal band.

2. Description of the Related Art

In recent years, the orthogonal frequency division multiplexing (OFDM) modulation method has been used as a modulation method in digital terrestrial broadcasting.

In the OFDM method, multiple subcarriers with different center frequencies are utilized to transmit symbols. Here, a symbol is a set of data transmitted in one modulation.

One symbol cycle is configured as a result of a guard interval (GI) being added to the effective symbol period. In the OFDM method, as shown in FIG. 9, part of the effective symbol signal serving as the actual demodulation target is copied and inserted between effective symbol signals as a repeated waveform. This allows OFDM to suppress the influence of multipath interference. The interval of this copied waveform is the guard interval.

In the case of demodulating this OFDM signal, the received OFDM signal is digitally converted by an A/D converter, the guard interval is removed, the effective symbol signal is extracted, and the effective symbol signal is demodulated by a fast Fourier transformer (FFT). Namely, as shown in FIG. 8, a correlation value between the received OFDM signal and the signal obtained by delaying the OFDM signal by the length of the effective symbol period is determined. Additionally, a maximum value of a value obtained by integrating this correlation value is extracted, and, on the basis of the timing of this maximum value, the guard interval is removed, the effective symbol period is extracted, and the effective symbol period is demodulated by the FFT (e.g., see Japanese Patent Application Laid-Open (JP-A) No. 11-163824 and JP-A No. 2000-059332).

However, as shown in FIG. 11, sometimes an undesired waveform signal (hereinafter referred to as "undesired power" or "undesired signal") having particular frequencies and large electrical power may be incorporated in the received signal band. Such undesired power does not have periodicity from copying the identical signal component such as the OFDM signal. Consequently, a rise in the proportion of undesired power causes a greater unintended fall in the correlation relationship. When the correlation value becomes too small, timing synchronization cannot be achieved based on the correlation value. This results in adverse impact on reception quality and sometimes reception cannot be obtained.

In consideration of the above, a technique is proposed to remove the incorporated undesired power by inserting a filter (see, for example JP-A No. 9-321733).

However, in the technique described in JP-A No. 9-321733, only the one OFDM symbol delayed signal is passed through the filter from the two input signals employed for obtaining a correlation. Accordingly, particular noise may remain in the input signal to the correlator, that is not delayed by one OFDM symbol. Consequently, the technique of JP-A No. 9-321733 is not satisfactory for securing robustness to noise with an intense particular frequency component.

SUMMARY OF THE INVENTION

The present invention provides a correlator and a demodulation device including the correlator that may evaluate autocorrelation so as not to be affected by noise, even when there is an undesired signal of large electrical power incorporated in the received signal band.

A first aspect of the present invention is a correlator including: a plurality of filter sections having different substantially non-overlapping pass-band characteristics from each other, each of the filter sections being input with an Orthogonal Frequency Division Multiplexing (OFDM) signal where one symbol period comprises an effective symbol period and a guard interval in which part of the signal of the effective symbol period has been copied; and a plurality of autocorrelation generating sections, provided so as to correspond to each of the plurality of filter sections, that generate autocorrelation signals based on the signals passed through the corresponding filter sections.

In a second aspect of the present invention, in the above first aspect, may further include: an autocorrelation output section that is input with each of the autocorrelation signals and, based on each of the autocorrelation signals, either selects one of the autocorrelations or generates an autocorrelation appropriate for obtaining timing synchronization, and outputs the selected or generated autocorrelation.

According to the above aspects of the present invention, the autocorrelation signal is not employed from the respective bands incorporating the undesired signal since the maximum value of the autocorrelation signal being relatively small. Consequently, the above aspects the present invention may suppress reception quality degradation due to the influence of undesired signal power.

In a third aspect of the present invention, in the above second aspect, the autocorrelation output section may select and output the autocorrelation signal having the largest maximum value from the autocorrelation signals.

In a fourth aspect of the present invention, in the above second aspect, the autocorrelation output section: may extract the autocorrelation signal having the largest maximum value from the autocorrelation signals; may set a threshold value by multiplying the extracted maximum value by a specific coefficient of less than 1; may extract from the remaining autocorrelation signals any autocorrelations having a maximum value greater than the threshold value; may addition-combine the autocorrelation signal having the largest maximum value and the extracted autocorrelation signals having maximum values greater than the threshold value; and may output the addition-combined autocorrelation signal.

According to the above aspects of the present invention, all autocorrelation signals having maximum values sufficiently close to the largest maximum value may be employed.

In a fifth aspect of the present invention, in the above second aspect, the autocorrelation output section: may extract any autocorrelation signals having a maximum value greater than a specific threshold value from the autocorrelation signals; may addition-combine the extracted autocorrelation signals; and may output the addition-combined autocorrelation signal.

According to the above aspect of the present invention, the threshold value is provided for determining the magnitude of the maximum value for selection as an employable autocorrelation signal, and all autocorrelation signals having maximum values greater than the threshold value may be employed.

In a sixth aspect of the present invention, in the above aspects, each of the plurality of autocorrelation generating sections may include: a delay section that delays the signal output from the corresponding filter section by the effective symbol period; a complex conjugate section that takes the complex conjugate of the delay signal from the delay section; a complex operation section that is input with the OFDM signal output from the filter section and the signal output from the complex conjugate section after delaying and complex conjugate processing, and that takes the complex-multiplies of the two signals; and a moving average processing section that takes a moving average of guard interval length portions of the output from the complex operation section, and that outputs the moving average as an autocorrelation signal.

In a seventh aspect of the present invention, in the above aspects, each of the plurality of autocorrelation generating sections may include: a phase conversion section that converts the signal output from the corresponding filter section into phase information and that outputs the phase information; a delay section that rotates the phase information by the effective symbol period; a subtraction section that compares the phase information and the rotated phase information, derives the difference therebetween and outputs the difference as a phase rotation amount; a vector conversion section that generates unit vectors from the phase rotation amount; and a moving average processing section that takes a moving average of guard interval length portions of the unit vector and outputs the moving average as an autocorrelation signal.

According to the above aspects of the present invention, due to converting the received signal first into phase information and then converting into unit vectors, the magnitude of the autocorrelation may be no longer influenced by the magnitude of the received signal.

In an eighth aspect of the present invention, in the above second aspect, the autocorrelation output section, when selecting one of the autocorrelations or generating an autocorrelation appropriate for obtaining timing synchronization, may apply a weighting to at least one of the signals employed, such that the output is similar to output from employing all the autocorrelation signals generated by the plurality of autocorrelation generating sections even for cases in which the appropriate autocorrelation is generated based on less than all of the autocorrelation signals generated by the plurality of autocorrelation generating sections.

According to the above aspects of the present invention, more stable timing synchronization may be obtained.

In a ninth aspect of the present invention, in the above aspects, the plurality of filter section may be two filter sections and the plurality of autocorrelation generating sections may be two autocorrelation generating sections.

In a tenth aspect of the present invention, in the above seventh aspect, the configuration from the phase conversion section to the vector conversion section may be a single-row configuration, and the correlator may further include: a first switching section, provided after the plurality of filter sections, that switches, every specific cycle, the input to the first switching section between the output signals of the plurality of filter sections, and that outputs the input signal to the phase conversion section; and a second switching section, provided after the vector conversion section, that switches, at the specific cycle, the output signal of the vector conversion section for input to each of the plurality of moving average processing sections.

According to the above aspects of the present invention, the circuit scale may be significantly decreased.

In an eleventh aspect of the present invention, in the above tenth aspect, the relationship between the number of data Dd stored in the delay section, and the number of data Df flowing in each of the filter sections during each specific cycle, may be given by Df=Dd/M, wherein M is an integer.

A twelfth aspect of the present invention is demodulation device including: an analog-to-digital conversion section that converts into a digital signal an analog orthogonal frequency division multiplexing (OFDM) signal where one symbol period comprises an effective symbol period and a guard interval in which part of the signal of the effective symbol period has been copied; the correlator according of claim 1 to which the digital OFDM signal is inputted; a timing detection section that outputs, on the basis of a correlation signal received from the correlator, a timing signal for extracting the effective symbol signal from the OFDM signal; a fast Fourier transform section that, on the basis of the timing signal that has been outputted from the timing detection section, extracts the effective symbol signal from the OFDM signal that has been digitally converted by the analog-to-digital conversion section, and that performs Fourier transform with respect to the effective symbol signal; and a demodulation section that performs demodulation processing on the signal after the Fourier transform process by the fast Fourier transform section to obtain a demodulated signal.

Namely, according to the twelfth aspect of the present invention, a demodulation device is employed including the correlator according to the above aspects. Accordingly, the twelfth aspect of the present invention may obtain stable timing synchronization and may improved reception characteristics, in a receiver having a synchronization function of determining time synchronization on the basis of peaks of autocorrelations.

As explained above, according to the above aspects of the present invention, evaluation of autocorrelation may be achieved so as not to be influenced by noise, when an undesired signal with large electrical power is incorporated in the received signal band.

BRIEF DESCRIPTION OF THE DRAWINGS

Exemplary embodiments of the present invention will be described in detail based on the following figures, wherein.

DETAILED DESCRIPTION OF THE INVENTION

Detailed explanation follows regarding preferable exemplary embodiments of the present invention, with reference to the drawings.

First Exemplary Embodiment

Figure 1:
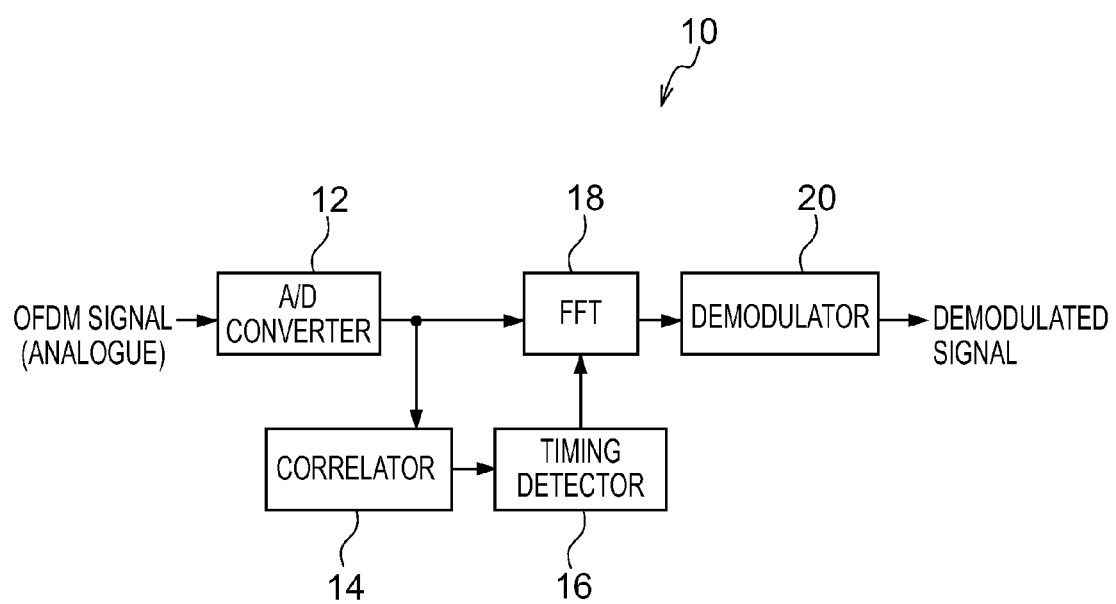
FIG. 1 is a schematic configuration diagram of an OFDM signal demodulation device according to first to sixth exemplary embodiments of the present invention.
Figure 9:
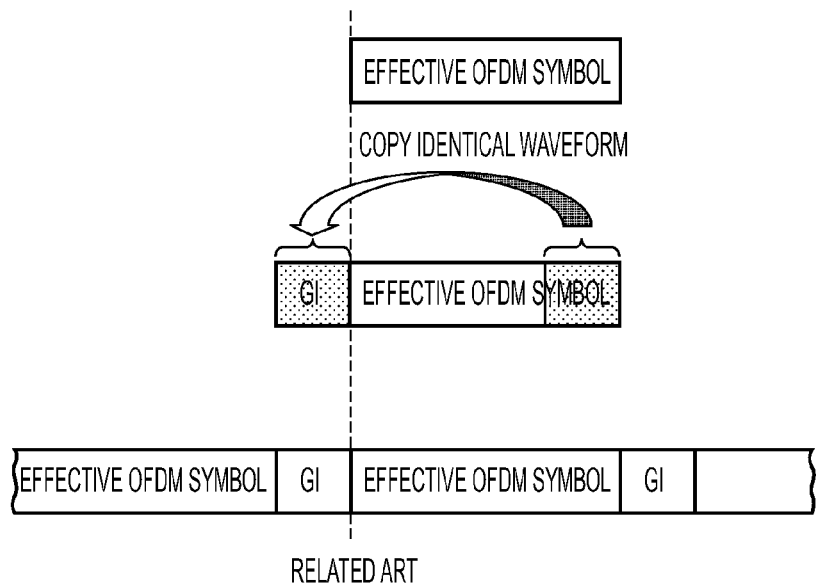
FIG. 9 is an explanatory diagram of an OFDM signal format.
Figure 10:
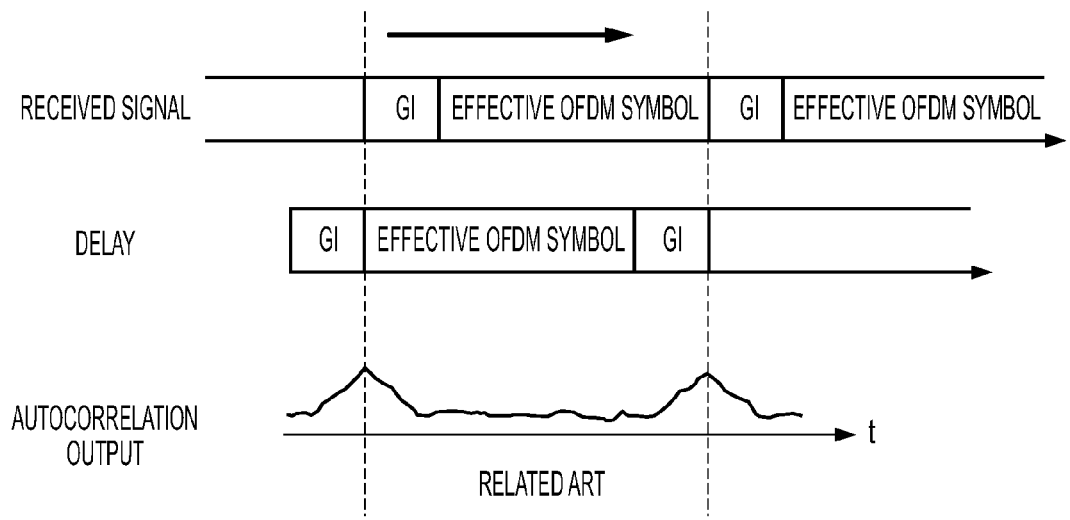
FIG. 10 is an explanatory diagram to explain a related method for deriving a correlation value between a received OFDM signal and a signal of the OFDM signal delayed by the effective symbol period length.
Figure 11:
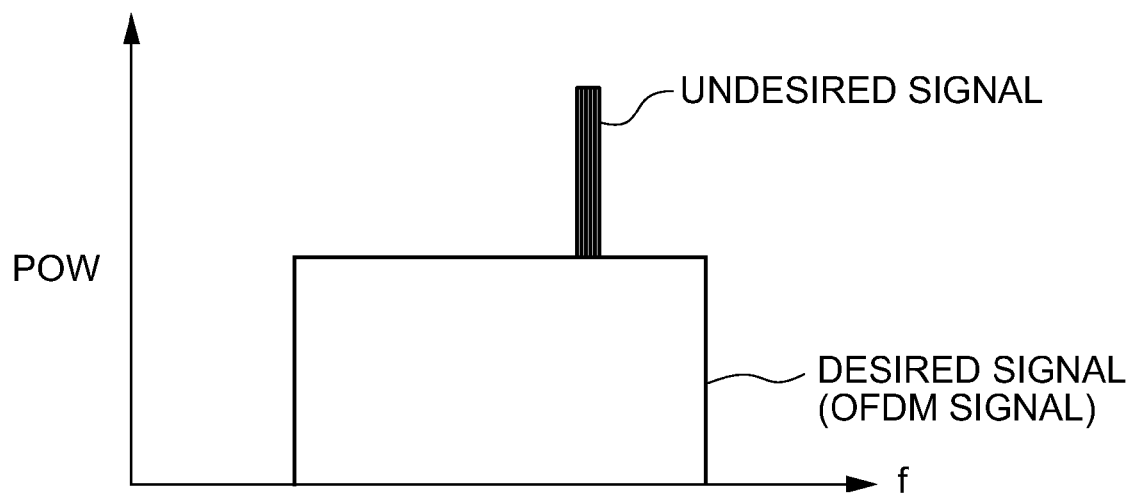
FIG. 11 is an explanatory diagram for explaining incorporation of undesired power.

FIG. 1 is a schematic configuration diagram of an orthogonal frequency division multiplexing (OFDM) signal demodulation device 10 according to a first exemplary embodiment of the present invention. The OFDM signal demodulation device 10 is a device that receives and demodulates an OFDM signal. As shown in FIG. 9, the OFDM signal is a signal where one symbol period includes an effective symbol period and a guard interval in which part of the signal of the effective symbol period has been copied. The signal of the effective symbol period excluding the guard interval is extracted from this OFDM signal, Fourier transform is performed on the signal of the effective symbol period (effective symbol signal), and the effective symbol signal is demodulated.

As shown in FIG. 1, the OFDM signal demodulation device 10 is equipped with an A/D converter 12, a correlator 14, a timing detector 16, a fast Fourier transformer (FFT) 18, and a demodulator 20.

The A/D converter 12 samples, in a predetermined cycle in synchronization with a sampling clock signal, a received analog OFDM signal, converts the analog OFDM signal into a digital signal, and outputs the digital signal to the correlator 14 and the FFT 18.

The correlator 14 determines the correlation between the OFDM signal that has been converted into the digital signal and a delay signal obtained by delaying the OFDM signal by one effective symbol period, and outputs a correlations signal representing the correlation to the timing detector 16.

The timing detector 16 outputs, on the basis of the correlation signal received from the correlator 14, a timing signal for extracting the effective symbol signal from the OFDM signal. Specifically, the timing detector 16 detects the timing when the correlation signal reaches a peak, and outputs the timing signal on the basis of this timing.

The FFT 18 extracts, on the basis of the timing signal that has been outputted from the timing detector 16, the effective symbol period from the OFDM signal that has been digitally converted by the A/D converter 12, and performs Fourier transform on the effective symbol signal.

The demodulator 20 performs demodulation processing on the signal after the Fourier transform process, to obtain a demodulated signal.

Figure 2:
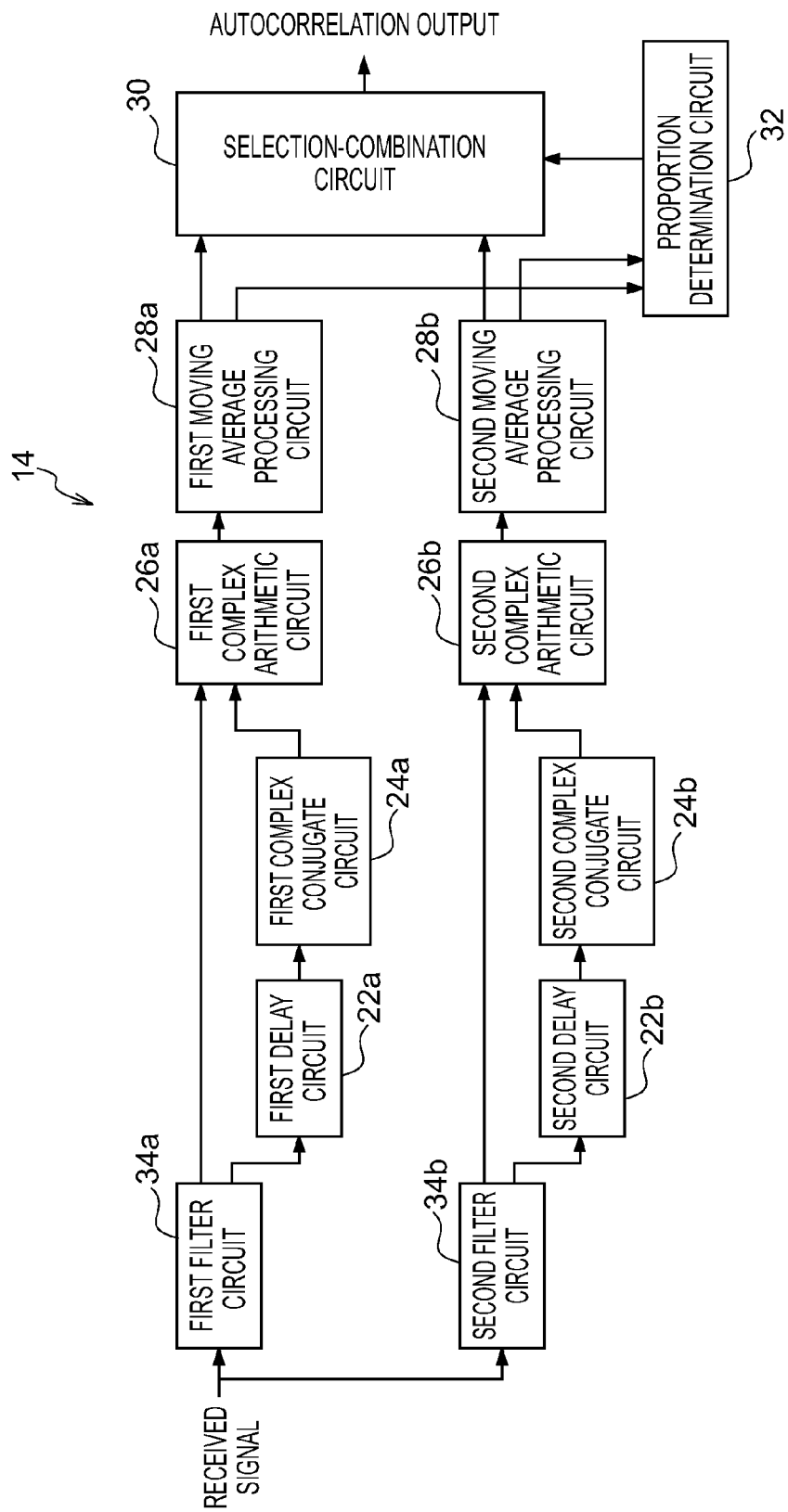
FIG. 2 is a configuration diagram of a correlator of the first exemplary embodiment.

FIG. 2 is a configuration diagram of the correlator 14 of the first exemplary embodiment.

The correlator 14 of the present exemplary embodiment is equipped with two filter circuits (a first filter circuit 34a, a second filter circuit 34b); two delay circuits (a first delay circuit 22a, a second delay circuit 22b); two complex conjugate circuits (a first complex conjugate circuit 24a, a second complex conjugate circuit 24b); two complex arithmetic circuits (a first complex arithmetic circuit 26a, a second complex arithmetic circuit 26b); two moving average processing circuits (a first moving average processing circuit 28a, a second moving average processing circuit 28a); a selection-combination circuit 30; and a proportion determination circuit 32.

When explanation is given without distinguishing between each of the filter circuits, they are referred to below simply as "filter circuit(s) 34", and the trailing letters will be omitted. Similarly, when explanation is given without distinguishing between each of the delay circuits, they are referred to below simply as "delay circuit(s) 22", and the trailing letters will be omitted. The two complex conjugate circuits are of the same configuration, and when explanation is given without distinguishing between each of the complex conjugate circuits, they are referred to below simply as "complex conjugate circuit(s) 24", and the trailing letters will be omitted. Similarly, the two complex arithmetic circuits are of the same configuration, and when explanation is given without distinguishing between each of the complex arithmetic circuits, they are referred to below simply as "complex arithmetic circuit(s) 26", and the trailing letters will be omitted. Similarly, the two moving average processing circuits are of the same configuration, and when explanation is given without distinguishing between each of the complex arithmetic circuits, they are referred to below simply as "moving average processing circuit(s) 28", and the trailing letters will be omitted.

The OFDM signal output from the A/D conversion section 12 is first input in parallel to the first filter circuit 34a and the second filter circuit 34b.

After the OFDM signal has passed through the first filter circuit 34a, the signal is input to one input terminal of the first complex arithmetic circuit 26a and also input to the first delay circuit 22a. The output terminal of the first delay circuit 22a is connected to the first complex conjugate circuit 24a. The output terminal of the first complex conjugate circuit 24a is connected to the other input terminal of the first complex arithmetic circuit 26a. The output terminal of the first complex arithmetic circuit 26a is connected to the first moving average processing circuit 28a.

Similarly, after passing through the second filter circuit 34b, the OFDM signal is input to one input terminal of the second complex arithmetic circuit 26b and also input to the second delay circuit 22b. The output terminal of the second delay circuit 22b is connected to the second complex conjugate circuit 24b. The output terminal of the second complex conjugate circuit 24b is connected to the other input terminal of the second complex arithmetic circuit 26b. The output terminal of the second complex arithmetic circuit 26b is connected to the moving average processing circuit 28b.

Both the output results from the first moving average processing circuit 28a and the moving average processing circuit 28b are input to both the selection-combination circuit 30 and to the proportion determination circuit 32. The determination result from the proportion determination circuit 32 is input to the selection-combination circuit 30. The result of processing by the selection-combination circuit 30 is output as an autocorrelation output.

Figure 3:
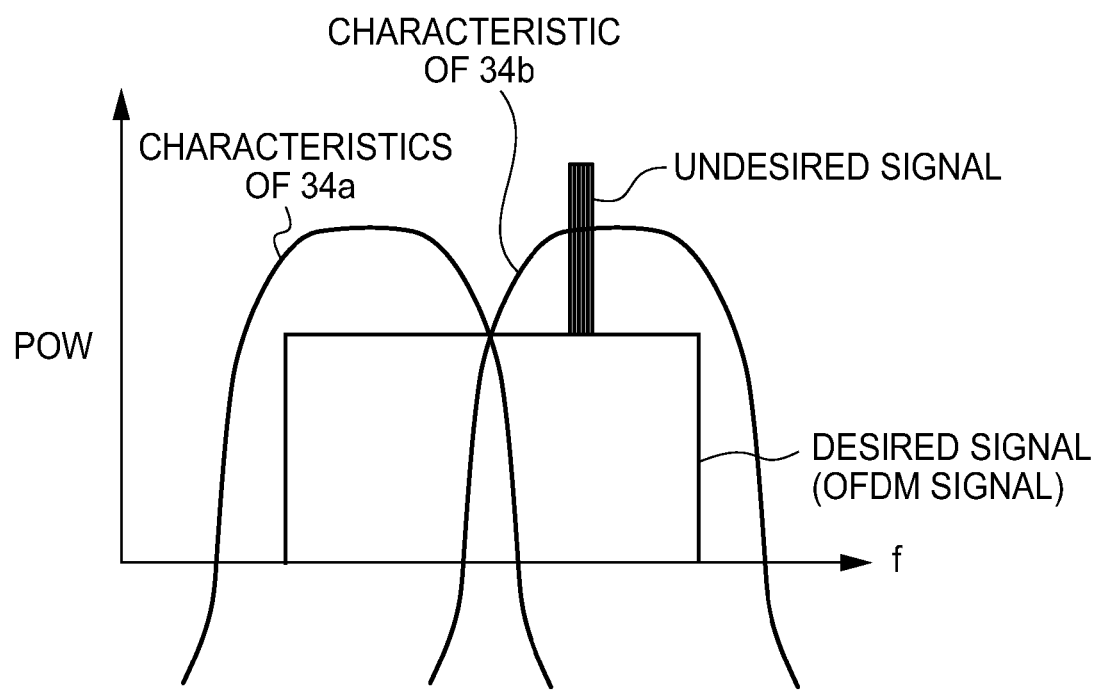
FIG. 3 is a diagram for examining the operation of a correlator of the first exemplary embodiment.

The first filter circuit 34a and the second filter circuit 34b have different pass-frequency characteristics from each other, so as not to substantially logically overlap with each other. Specifically, as shown in FIG. 3 for example, the first filter circuit 34a has pass-frequency characteristics covering the lower frequency side half of the anticipated OFDM signal frequency band. Further, the second filter circuit 34b has pass-frequency characteristics covering the higher frequency side half of the anticipated OFDM signal frequency band.

The first delay circuit 22a and the second delay circuit 22b delay the signals output from the first filter circuit 34a and the second filter circuit 34b, respectively, by one effective OFDM symbol period (the length of OFDM modulation signal not including the GI).

The first complex conjugate circuit 24a and the second complex conjugate circuit 24b each take complex conjugates of the delay signals output from the first delay circuit 22a and the second delay circuit 22b, respectively. Note that, configuration may be made such that the first complex conjugate circuit 24a and the second complex conjugate circuit 24b are connected at the signal side, prior to delaying by one effective symbol period, and complex conjugates are taken at this stage. Namely, in such a configuration, the first complex conjugate circuit 24a takes a complex conjugate of the OFDM signal from the first filter circuit 34a prior to delay, and the second complex conjugate circuit 24b takes a complex conjugate of the signal from the second filter circuit 34b.

Then, the first complex arithmetic circuit 26a takes the complex-multiplies of the OFDM signal that has passed through the first filter circuit 34a, and the signal from the first complex conjugate circuit 24a after delay and after complex conjugate processing. Similarly, the second complex arithmetic circuit 26b takes the complex-multiplies of the OFDM signal that has passed through the second filter circuit 34b, and the signal from the second complex conjugate circuit 24b after delay and after complex conjugate processing.

Next, the first moving average processing circuit 28a takes the moving average of the guard interval (GI) length with respect to the output from the first complex arithmetic circuit 26a. That is, as described in FIG. 9, the GI portion is identical to part of the OFDM signal, and the maximum autocorrelation effect should be obtained in a case where that portion matches. However, because the time position at which the maximum autocorrelation effect is obtained is not known beforehand, the first moving average processing circuit 28a searches for that time position in regard to that GI length.

In a similar manner, the second moving average processing circuit 28b takes moving averages of the GI length for the output from the second complex arithmetic circuit 26b.

The proportion determination circuit 32 compares the maximum values of each of the autocorrelation signals, output from the first moving average processing circuit 28a and the second moving average processing circuit 28b, respectively, and determines the magnitude relationship between these.

The selection-combination circuit 30 is input by each of the autocorrelation signals output from the first moving average processing circuit 28a and the second moving average processing circuit 28b, and is also input by the determination result from the proportion determination circuit 32. Based on the determination result from the proportion determination circuit 32, the selection-combination circuit 30 then selects the larger of the maximum values of the respective autocorrelation signals output from, the first moving average processing circuit 28a and the second moving average processing circuit 28b, and outputs as the autocorrelation output.

By the above configuration, the present exemplary embodiment may reduce degradation in reception quality due to the influence of undesired signal power. Detailed explanation will be given below regarding this feature.

It can be seen by reference to FIG. 3 that, for example, there may be an undesired signal included with the frequencies shown in FIG. 3. The undesired signal is blocked by the first filter circuit 34a but has frequencies that pass through the second filter circuit 34b.

Consequently, the undesired signals is removed in the path including the first filter circuit 34a, and correlation to the signal delayed by one effective symbol period, namely the output of the first moving average processing circuit 28a, is a comparatively high value. For all sub-carriers arrayed in the reception band, the OFDM signal uses a copy of the modulation signal as the guard interval (GI). Accordingly, autocorrelation of the OFDM signal can be obtained even though the band of the OFDM signal has become half after passing through filters as shown in FIG. 3.

However, the undesired signals in the path including the second filter circuit 34b pass through the second filter circuit 34b unaffected, and are still contained in the output signal. Accordingly, correlation to the signal delayed by one effective symbol period, namely the output of the second moving average processing circuit 28b, is smaller in comparison to the output of the first moving average processing circuit 28a. Consequently, by outputting the output of the correlator having the larger correlation value from the two correlation values, even if the original OFDM signal contains an undesired signal, a value arrived is equivalent to deriving the correlation based on an OFDM signal not containing the undesired signal.

Accordingly, the above described functionality may be implemented by providing the proportion determination circuit 32 for determining the magnitude of the correlation values, and by providing the selection-combination circuit 30 for selectively outputting a correlation value based on the determination result of the proportion determination circuit 32.

In the exemplary embodiment shown in FIG. 2, the moving average processing circuit 28 is included for taking moving averages of the GI length. Generally, when the moving average processing circuit 28 is provided with a data buffer of the moving average length, the circuit scale becomes large. However, the present exemplary embodiment is equipped with the plural filter circuits 34 having different pass-frequency characteristics from each other, and a circuit configuration for autocorrelation determined for each of these filter circuits. Thus, the present exemplary embodiment selects and outputs the appropriate autocorrelation from the obtained plural autocorrelations. Consequently, the present exemplary embodiment is configured to derive autocorrelation from after the filter circuits, by the delay circuits 22, the complex conjugate circuits 24, the complex arithmetic circuits 26 and the moving average processing circuits 28. However there is no limitation thereto. For example, a memory may be used instead of the delay circuits 22. In this example, not only storing the section of the data for moving average processing, but as the implement moving average processing, new data to be added and the oldest data to be removed may be read from the memory, and may be inputted to a separate accumulator (add the new data, remove the old data). In the above example, the present exemplary embodiment may reduce the circuit scale by removing the necessity for storing data at intermediate stages outside the memory.

As explained above, according to the first exemplary embodiment of the present invention, even when there is undesired power or an undesired signal in the received signal band autocorrelation may be determined without being affected by such noise, and better timing synchronization may be obtained. As a result, the first exemplary embodiment of the present invention may reduce degradation of reception quality.

Second Exemplary Embodiment

Figure 4:
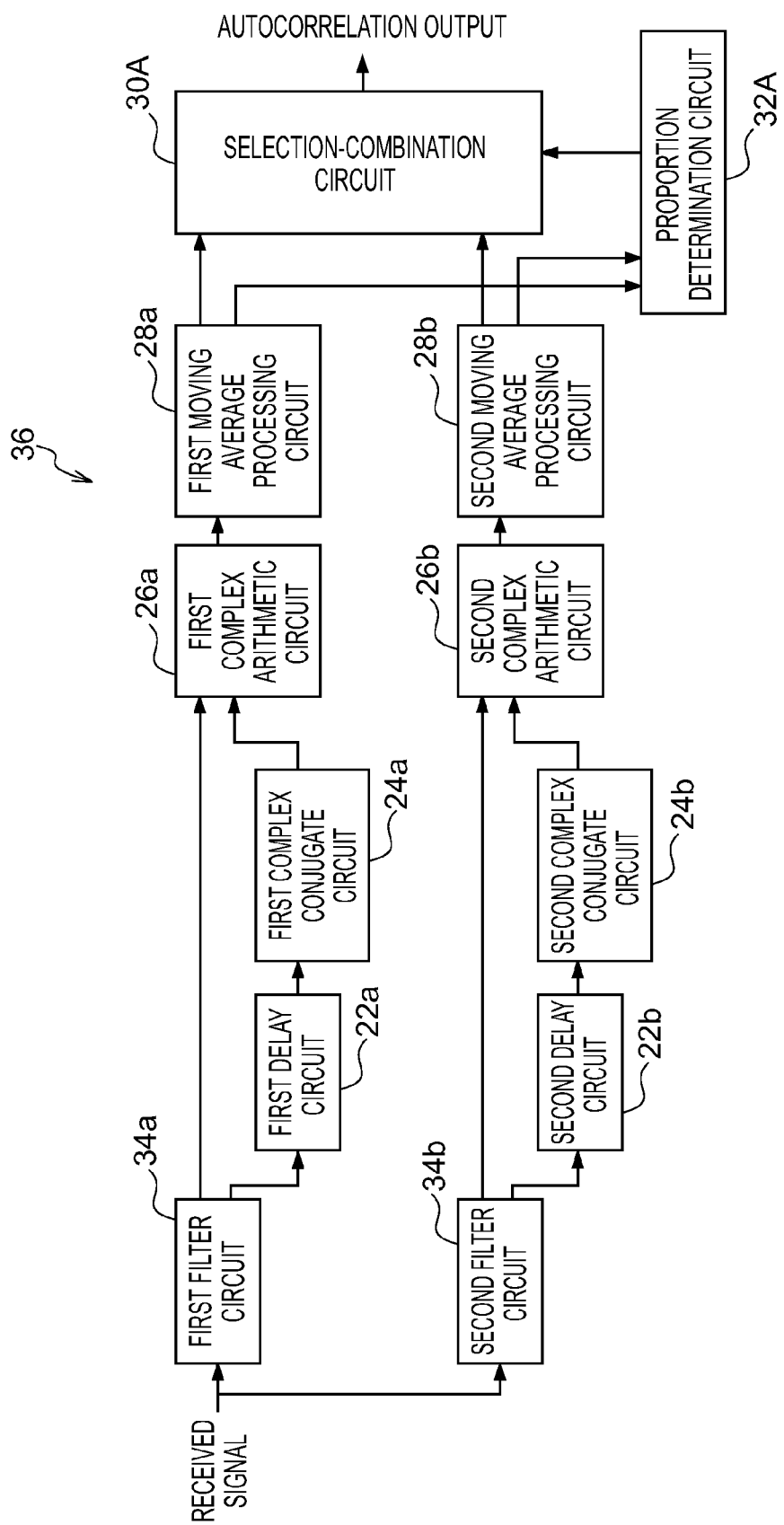
FIG. 4 is a configuration diagram of a correlator of the second exemplary embodiment.

FIG. 4 is a diagram illustrating a configuration of a correlator 36 according to a second exemplary embodiment. The correlator 36 includes a proportion determination circuit 32A and a selection-combination circuit 30A with different functionality to that of the proportion determination circuit 32 and the selection-combination circuit 30 in the correlator 14 of the first exemplary embodiment. Since other parts of the configuration are similar to those of the correlator 14 of the first exemplary embodiment, the same reference numerals are appended and further explanation thereof is omitted. Due to the demodulation device as a whole being similar, other than with respect to the correlator, further explanation thereof is also omitted.

The proportion determination circuit 32A of the second exemplary embodiment has a pre-set threshold value. The proportion determination circuit 32A is configured to compare the maximum values of the autocorrelations for OFDM symbol length sections, output from the first moving average processing circuit 28a and the second moving average processing circuit 28b, respectively, against the threshold value.

When the result of comparison is that the maximum values of the two autocorrelations are both larger than the threshold value, the proportion determination circuit 32A notifies to the selection-combination circuit 30A. Based on this notification, the selection-combination circuit 30A performs addition-combination on the two autocorrelations, input from the first moving average processing circuit 28a and the second moving average processing circuit 28b, respectively, for output as the autocorrelation output.

However, when the result of comparison is that only one of the maximum values of the two autocorrelations is larger than the threshold value, the proportion determination circuit 32A notifies to the selection-combination circuit 30A. Based on this notification, the selection-combination circuit 30A selects the autocorrelation having the maximum value greater than the threshold value, from the two autocorrelations input from the first moving average processing circuit 28a and the second moving average processing circuit 28b, respectively, for output as the autocorrelation output.

However, when the result of comparison is that the maximum values of both the two autocorrelations are smaller than the threshold value, the proportion determination circuit 32A notifies to the selection-combination circuit 30A. Based on this notification, the selection-combination circuit 30A either: selects the autocorrelation having the largest maximum value from the two autocorrelations input from the first moving average processing circuit 28a and the second moving average processing circuit 28b, respectively, for output as the autocorrelation output; or performs addition-combination on the two autocorrelations for output as the autocorrelation output.

In the first exemplary embodiment, even when two good autocorrelations are obtained, only the larger one of these is output alone as the autocorrelation. However, in the second exemplary embodiment, when two good autocorrelations are obtained, both these autocorrelations are added together and output. Accordingly, the second exemplary embodiment may generate an autocorrelation using a wider frequency band of the received signal, better stabilizing timing synchronization and contributing to better reception quality. Further, the second exemplary embodiment may reduce degradation in reception quality by selecting as the threshold value a value previously determined as one that obtains reliable autocorrelation.

Third Exemplary Embodiment

Figure 5:
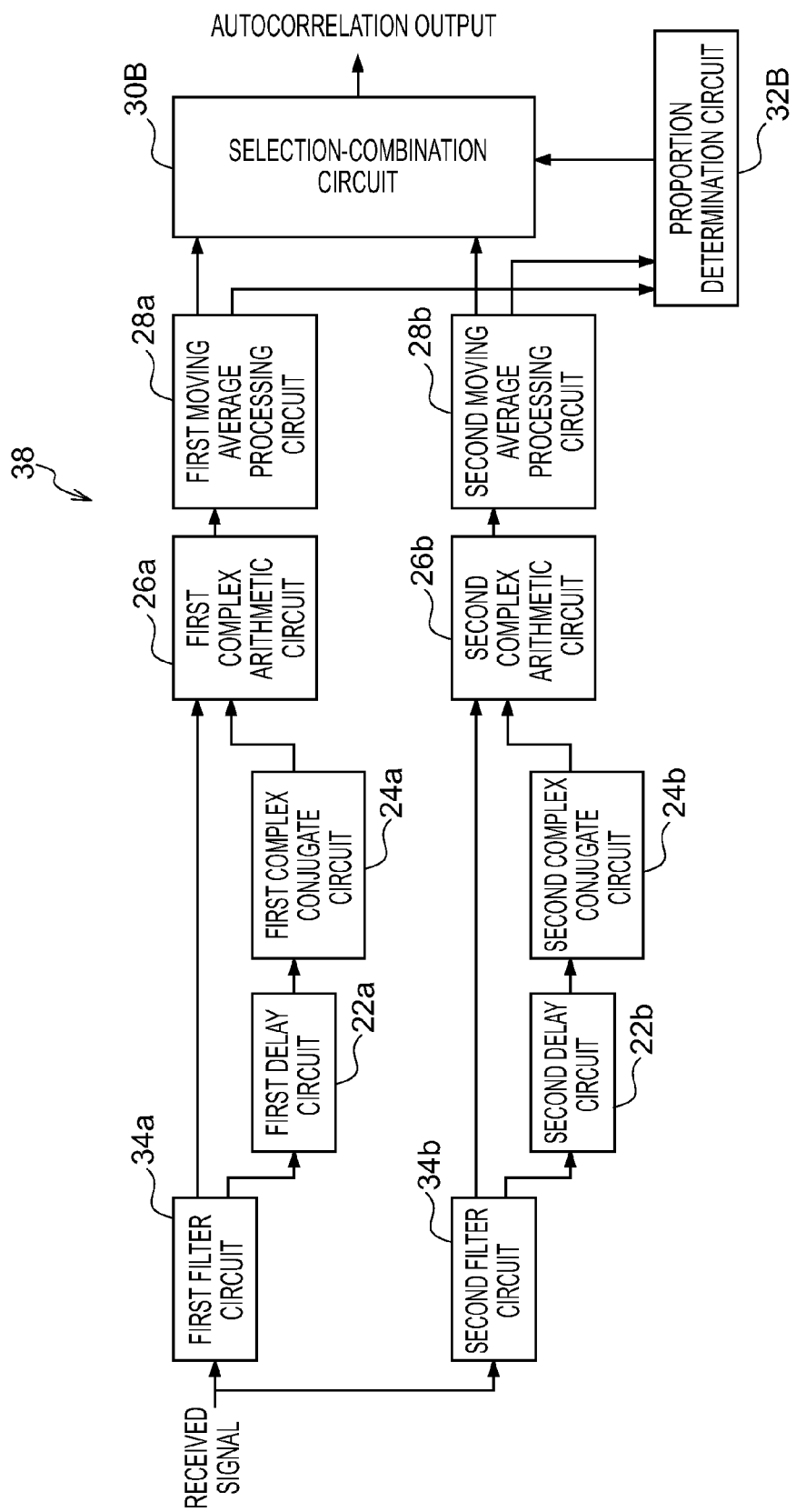
FIG. 5 is a configuration diagram of a correlator of the third exemplary embodiment.

FIG. 5 is a diagram illustrating a configuration of a correlator 38 of a third exemplary embodiment. The correlator 38 includes a proportion determination circuit 32B and a selection-combination circuit 30B with different functionality to that of the proportion determination circuit 32 and the selection-combination circuit 30 in the correlator 14 of the first exemplary embodiment. Since other parts of the configuration are similar to those of the correlator 14 of the first exemplary embodiment, the same reference numerals are appended and further explanation thereof is omitted. Due to the demodulation device as a whole being similar, other than with respect to the correlator, further explanation thereof is also omitted.

The selection-combination circuit 30B in the third exemplary embodiment first compares against each other the respective maximum values of the autocorrelations for the OFDM symbol length sections, from the first moving average processing circuit 28a and the second moving average processing circuit 28b. After making the comparison, the selection-combination circuit 30B multiplies the larger of the maximum values by a predetermined coefficient $\alpha(0<\alpha<1)$, and sets the obtained value as the threshold value. The selection-combination circuit 30B then compares the obtained threshold value against the smaller of the maximum values.

When the result of comparison is that the smaller of the maximum values is larger than the threshold value, the proportion determination circuit 32B notifies to the selection-combination circuit 30B. Based in this notification, the selection-combination circuit 30B addition-combines the two autocorrelations input from the first moving average processing circuit 28a and the second moving average processing circuit 28b, respectively, for output as the autocorrelation output.

However, when the result of comparison is that the smaller of the maximum values is smaller than the threshold value, the proportion determination circuit 32B notifies to the selection-combination circuit 30B. Based on this notification, the selection-combination circuit 30B selects the largest of the maximum values from the two autocorrelations input from the first moving average processing circuit 28a and the second moving average processing circuit 28b, respectively, for output as the autocorrelation output.

The above processing, the present exemplary embodiment employs the larger of the autocorrelations when there is a meaningful difference between the two autocorrelations, and employs both autocorrelations when there is no meaningful difference between the two autocorrelations. Accordingly, similarly to the second exemplary embodiment, the present exemplary embodiment contributes to better reception quality. Furthermore, when the maximum values of the autocorrelations become small (such as during multi-path reception) even when the reception power is high due to propagation path conditions, the autocorrelation to be employed may be selected irrespective of the propagation conditions, by performing a relative comparison with the other autocorrelation.

Fourth Exemplary Embodiment

Figure 6:
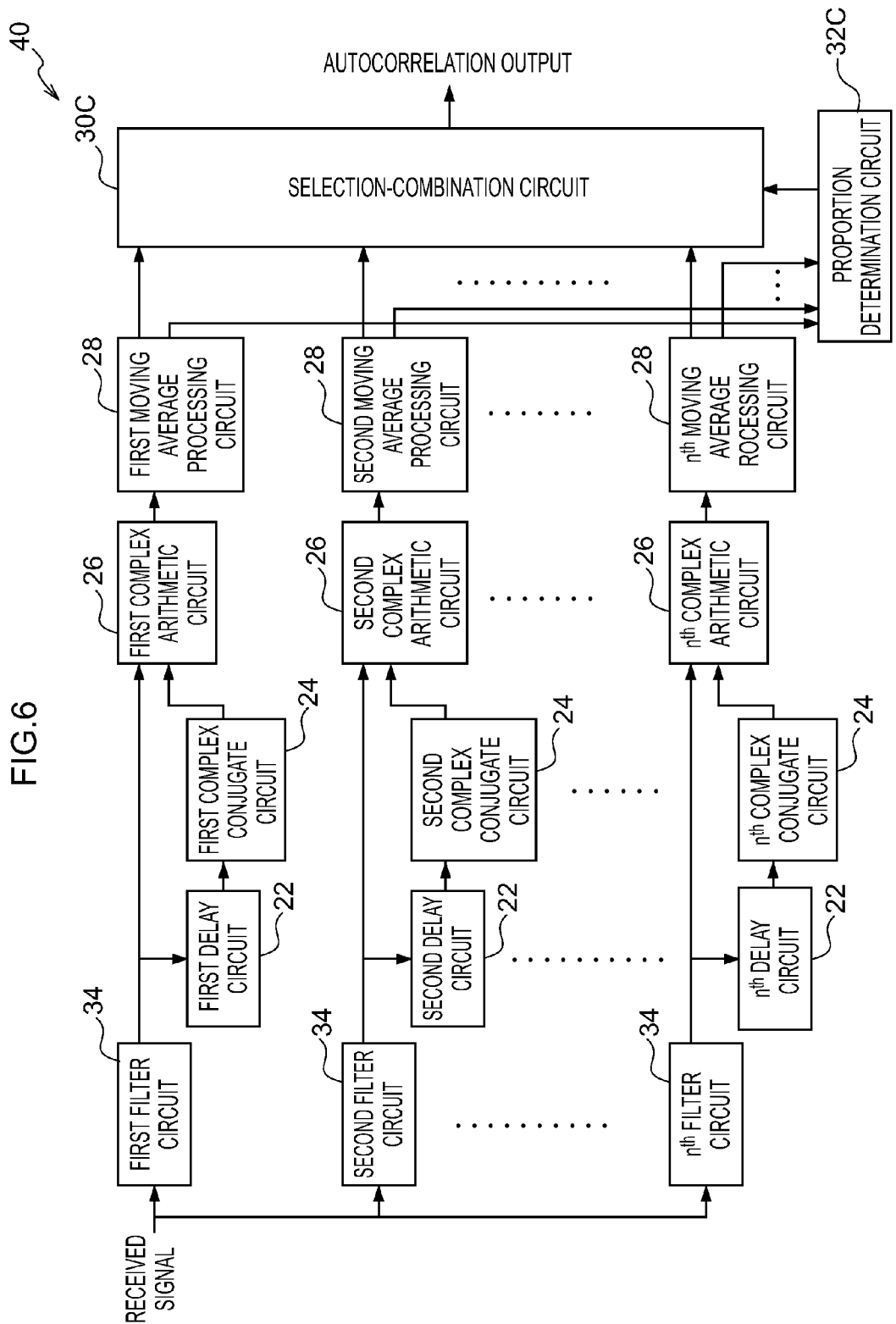
FIG. 6 is a configuration diagram of a correlator of the fourth exemplary embodiment.

For the fourth exemplary embodiment an example of a generalization of the first to third exemplary embodiments to a multi-row system will be described. FIG. 6 is a diagram illustrating a configuration of a correlator 40 according to the fourth exemplary embodiment. Due to the demodulation device as a whole being similar to the first to the third exemplary embodiments, other than with respect to the correlator, further explanation thereof is omitted.

In the first to the third exemplary embodiments, two autocorrelations were derived by using two each of the filter circuits 34, the delay circuits 22, the complex conjugate circuits 24, the complex arithmetic circuits 26, and the moving average processing circuits 28. Namely, the first to the third exemplary embodiments were configured with two row configurations. However, in the fourth exemplary embodiment, n of each of the circuits are provided, in an n-row configuration and n individual autocorrelations are derived.

Namely, the correlator 40 includes: first to $n^{th}$ filter circuits 34; first to $n^{th}$ delay circuits 22; first to $n^{th}$ complex conjugate circuits 24; first to $n^{th}$ complex arithmetic circuits 26; first to $n^{th}$ moving average processing circuits 28; a selection-combination circuit 30C; and a proportion determination circuit 32C.

In the first to the third exemplary embodiment, the anticipated frequency band is split into two, logically low and logically high, with pass-frequencies of the first filter circuit 34a and the second filter circuit 34b set correspondingly. In the fourth exemplary embodiment, the anticipated frequency band is split into n individual divisions, with pass-frequencies of the first to $n^{th}$ filter circuits 34 set correspondingly. The processing of the first to $n^{th}$ delay circuits 22, the first to $n^{th}$ complex conjugate circuits 24, the first to $n^{th}$ complex arithmetic circuits 26, the first to $n^{th}$ moving average processing circuits 28 is basically the same as that in the respective circuits of the first to the third exemplary embodiment.

The proportion determination circuit 32C and the selection-combination circuit 30C perform processing equivalent to that of their respective counterparts in the first to the third exemplary embodiments.

Namely, in a case where configurations are equivalent to that of the first exemplary embodiment, the proportion determination circuit 32C determines which autocorrelation has the largest maximum value from out of the n individual autocorrelations derived, and notifies to the selection-combination circuit 30C. In response the selection-combination circuit 30C then outputs the autocorrelation with the largest maximum value without modification.

Further, in a case where configurations are equivalent to that of the second exemplary embodiment, the proportion determination circuit 32C extracts the maximum values greater than a threshold value from the n individual autocorrelations, and addition-combines all of the autocorrelations with maximum values greater than the threshold value for output as the autocorrelation output. However, when the proportion determination circuit 32C determines that none of the autocorrelations has a maximum value greater than the threshold value, the selection-combination circuit 30C either outputs the autocorrelation with the largest maximum value, or addition-combines all of the autocorrelations for output.

Furthermore, in a case where configurations are equivalent to that of the third exemplary embodiment, the proportion determination circuit 32C first extracts the autocorrelation having the largest maximum value from the n individual autocorrelations. The proportion determination circuit 32C then multiplies this maximum value by a predetermined coefficient $\alpha(0<\alpha<1)$, and sets the value obtained therefrom as a threshold value. The proportion determination circuit 32C then compares the obtained threshold value against the maximum values of the other (n−1 individual) remaining autocorrelations, and extracts autocorrelations having a maximum value greater than the threshold value. The selection-combination circuit 30C then addition-combines the autocorrelation having the largest maximum value with all the extracted autocorrelations having maximum values greater than the threshold value, and outputs the result. However, when there is not a single autocorrelation with a maximum value greater than the threshold value the selection-combination circuit 30C selects the autocorrelation having the largest maximum value for output as the autocorrelation output.

In the first to the third exemplary embodiment, two of the filter circuits 34 are employed to share coverage of the anticipated frequency band. Accordingly, when the frequencies has an undesired signal present only in a particularly narrow range, namely when the undesired signal has particular frequencies, substantially half of the band that includes the undesired signal is not actually employed so as to remove the undesired signals.

In contrast, since n individual filter circuits 34 are employed in the fourth exemplary embodiment, the anticipated frequency band is split into n individual divisions. Accordingly, although the signal band(s) discarded when removing undesired signal(s) having particular frequencies depends on both the width of the particular frequencies of the undesired signals and on the value of n, basically only a portion of one filter circuit 34 pass-frequency width is discarded in cases where the undesired signal have sufficiently sharp frequency characteristics. In other words, signal including the bands of frequencies resulting from combining together the pass-frequencies of all the other n−1 individual filter circuits 34 can be employed in the autocorrelation computation, namely utilized for implementing timing synchronization. Accordingly stable timing synchronization may be implemented, and as a result, degradation in reception quality may be suppressed.

Further, not a single undesired signal as mentioned above, but multiple undesired signals may occur. In such cases, for the first to the third exemplary embodiments, if the undesired signals occur in the pass-frequencies of both the filter circuits 34, a reliable autocorrelation may not be obtained, and the timing synchronization may not be sufficiently achieved. However, as long as the frequencies of the undesired signals do not straddle plural of the filter circuits 34, according to the fourth exemplary embodiment, by splitting the anticipated frequency band into n individual divisions and setting n individual filter circuits 34 correspondingly, the number of individual filter circuits 34 unable to be considered may be minimized, namely is only the number of individual undesired signals at the most. Therefore, signal including the band of frequencies resulting from combining the pass-frequencies of all of the remaining filter circuits 34 may be utilized in computation of the autocorrelation, namely all may be utilized in implementation of timing synchronization.

Note that, how may divisions to make in the anticipated frequency band, namely the value to use for n, is based on a tradeoff between the frequency width of the anticipated undesired signals, and the practicality and cost incurred by increasing the number of n.

Fifth Exemplary Embodiment

Figure 7:
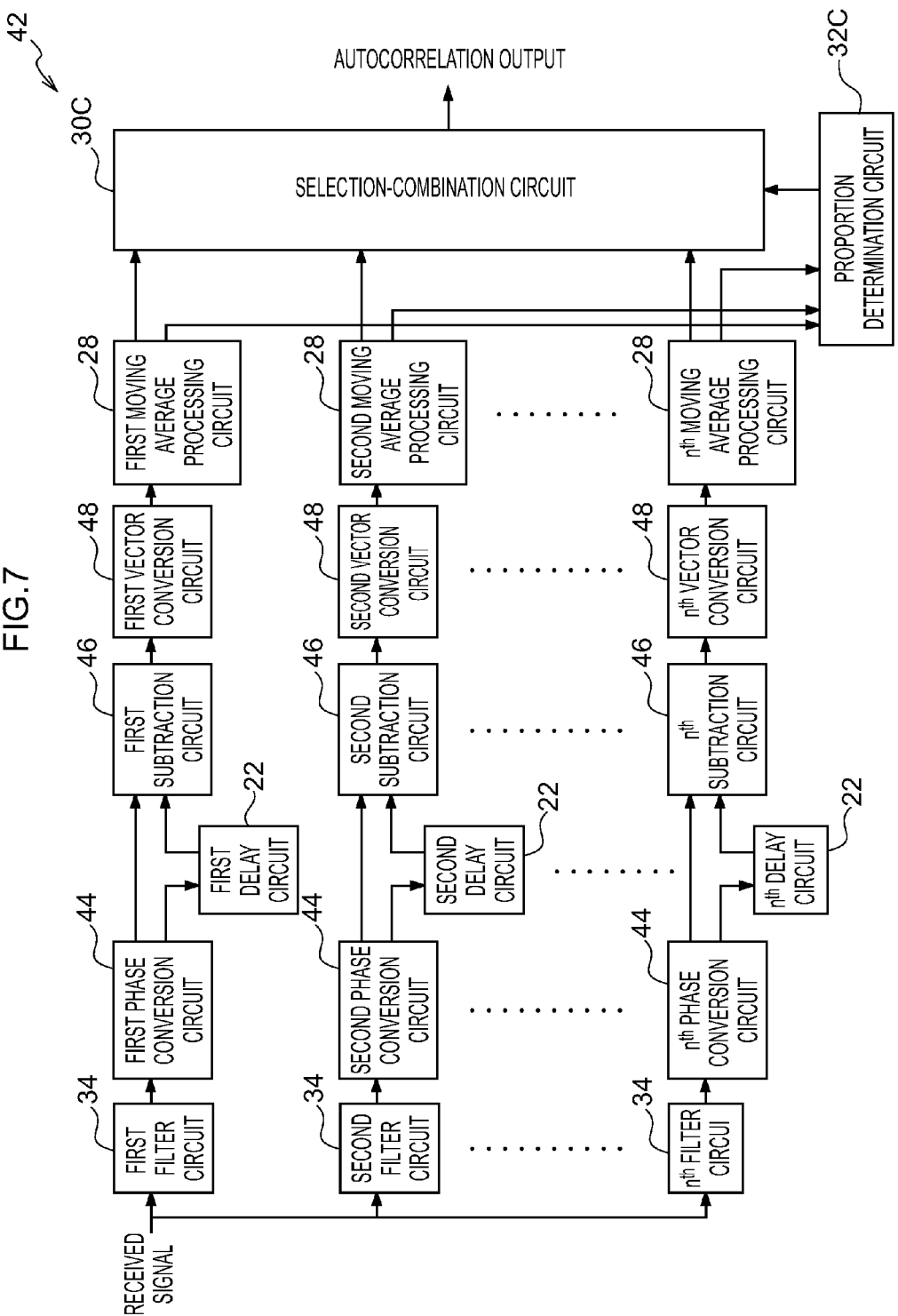
FIG. 7 is a configuration diagram of a correlator of the fifth exemplary embodiment.

FIG. 7 is a diagram illustrating a configuration of a correlator 42 of a fifth exemplary embodiment. The fifth exemplary embodiment, similarly to the fourth exemplary embodiment, has an n-row circuit configuration. However the circuit path configuration for deriving each of the autocorrelations is different to that in the first to the fourth exemplary embodiment. Similarly to the fourth exemplary embodiment, due to the demodulation device as a whole being similar to the first to the third exemplary embodiments, other than with respect to the correlator, further explanation thereof is also omitted.

The correlator 42 of the fifth exemplary embodiment includes: first to $n^{th}$ filter circuits 34; first to $n^{th}$ phase conversion circuits 44; first to $n^{th}$ delay circuits 22; first to $n^{th}$ subtraction circuits 46; first to $n^{th}$ vector conversion circuits 48; first to $n^{th}$ moving average processing circuits 28; a selection-combination circuit 30C; and a proportion determination circuit 32C.

The OFDM signal output from the A/D conversion section 12 is first input in parallel to each of the first to $n^{th}$ filter circuits 34. The OFDM signals that have passed through the respective first to $n^{th}$ filter circuits 34 are input to the respective first to $n^{th}$ phase conversion circuits 44.

The output signals from the first to $n^{th}$ phase conversion circuits 44 are respectively input to one of the input terminals of the first to $n^{th}$ subtraction circuits 46, and also to the first to $n^{th}$ delay circuits 22. The respective output terminals of the first to $n^{th}$ delay circuits 22 are connected to the other input terminals of the respective first to $n^{th}$ subtraction circuits 46.

The output signals from the first to $n^{th}$ subtraction circuits 46 are input to the respective first to $n^{th}$ vector conversion circuits 48. The output signals of the first to $n^{th}$ vector conversion circuits 48 are respectively input to the first to $n^{th}$ moving average processing circuits 28.

The output results from the first to $n^{th}$ moving average processing circuits 28 are respectively input to the selection-combination circuit 30C. The determination result from the proportion determination circuit 32C is input to the selection-combination circuit 30C. The processing result by the selection-combination circuit 30C is output as the autocorrelation output.

The configuration, function and operation of the first to $n^{th}$ filter circuits 34 are similar to those of the fourth exemplary embodiment. The first to $n^{th}$ phase conversion circuits 44 are input with the output signal from the corresponding first to $n^{th}$ filter circuits 34, and convert the signals into phase information for output.

The first to $n^{th}$ delay circuits 22 respectively rotate the phase information output from the first to $n^{th}$ phase conversion circuits 44 by an amount equivalent to one effective OFDM symbol period (the length of the OFDM modulation signal not including the GI).

The first to $n^{th}$ subtraction circuits 46 compare the phase information directly output from the first to $n^{th}$ phase conversion circuits 44, against the phase information rotated by the first to $n^{th}$ delay circuits 22, and derive differences therebetween for output as phase rotation amounts.

The first to $n^{th}$ vector conversion circuits 48 generate unit vectors from the phase rotation amounts output from the first to $n^{th}$ subtraction circuits 46. Then the first to $n^{th}$ moving average processing circuits 28 take moving averages of the GI (guard interval) length for the unit vectors output from the first to $n^{th}$ vector conversion circuits 48, and output as autocorrelations.

The configuration and operation of the proportion determination circuit 32C and the selection-combination circuit 30C are similar to their counterparts in the fourth exemplary embodiment.

When the autocorrelation is generated using the received signal in the first to the fourth exemplary embodiments, the maximum value of the autocorrelation is affected by the magnitude of the received signal. In contrast thereto, in the fifth exemplary embodiment, the magnitude of the autocorrelation is not influenced by the magnitude of the received signal due to the received signal being first converted into phase information and then into unit vectors. Accordingly, changes in the magnitude of the autocorrelation depend on the propagation path conditions, state of noise and/or the undesired signal power ratio. Accordingly, in the fifth exemplary embodiment, the outputs of autocorrelation from passing through each of the filter circuits are at equivalent levels to cases with no noise or undesired signal power, if the propagation path is in good condition.

Hereinbelow, the theory will be described with respect to such output levels. Namely, as described above, the each processing in the proportion determination circuit 32C and the selection-combination circuit 30C is similar to that of the fourth exemplary embodiment. Namely, the similar processing is performed to the processing of one or other of the first to the third exemplary embodiments. When this processing is performed, there are occasions when all of the n individual autocorrelations are employed (for example, when the processing method of the second exemplary embodiment is applied and all of the maximum values of the autocorrelations are greater than the threshold value). However, there are also occasions when the some of these n individual autocorrelations are not employed. For example, when the processing method of the first exemplary embodiment is applied (the autocorrelation having the maximum value is employed), or when the processing method of the second exemplary embodiment is applied and not all of the maximum values are greater than the threshold value.

On such occasions, if the number of the autocorrelations not employed is denoted as m, and when combination is performed by employing the n−m individual autocorrelations, the output is (n−m)/n times that of cases in which combination is performed employing all of the n individual autocorrelations. In an extreme case, if only a maximum of 1 autocorrelation is employed, the output will be 1/n.

However, even when there are autocorrelations that are not employed, the output can always be made to be equivalent to cases when all of the n individual autocorrelations are employed, by applying weightings to the employed autocorrelations and performing combination as set out below.

Namely, for example, the autocorrelations other than the autocorrelation with the largest maximum value out of the (n−m) individual autocorrelations employed are combined without modification, but the autocorrelation having the largest maximum value is multiplied by (m+1) and combined. When such an approach is adopted, output is (n−m−1)/n+1× (m+1)/n=n/n=1, resulting in the same output as when all of the n individual autocorrelations are employed.

In particular, when only one autocorrelation having the largest value is employed, m is the same as n−1, and hence (m+1) times becomes n times, and (1/n)×n again becomes 1.

However, in a processing method in which the autocorrelation having the largest maximum value is multiplied by (m+1) times, and the other autocorrelations are combined without modification, even when there is a comparatively large value for m, an autocorrelation results in which the autocorrelation having the largest maximum value is emphasized. However, if not only the autocorrelation with the largest maximum value is increased but also the autocorrelation with the second largest maximum value is increased to a given proportion, then, by setting the output to be equivalent to when all n individual autocorrelations are employed, more stable timing synchronization can be obtained.

A further development of this approach is to increase the autocorrelation having the third or greater largest local maximum values by appropriate ratios, and by then setting the output to be equivalent to when all n individual autocorrelations are employed, an autocorrelation output can be generated that enables even more stable timing synchronization to be obtained.

Note that while explanation has been given of a generalized n-row configuration for the above fifth exemplary embodiment, configuration may be made with a two-row configuration, similarly to in the first to the third exemplary embodiment, or with a given specific number of rows.

Sixth Exemplary Embodiment

Figure 8:
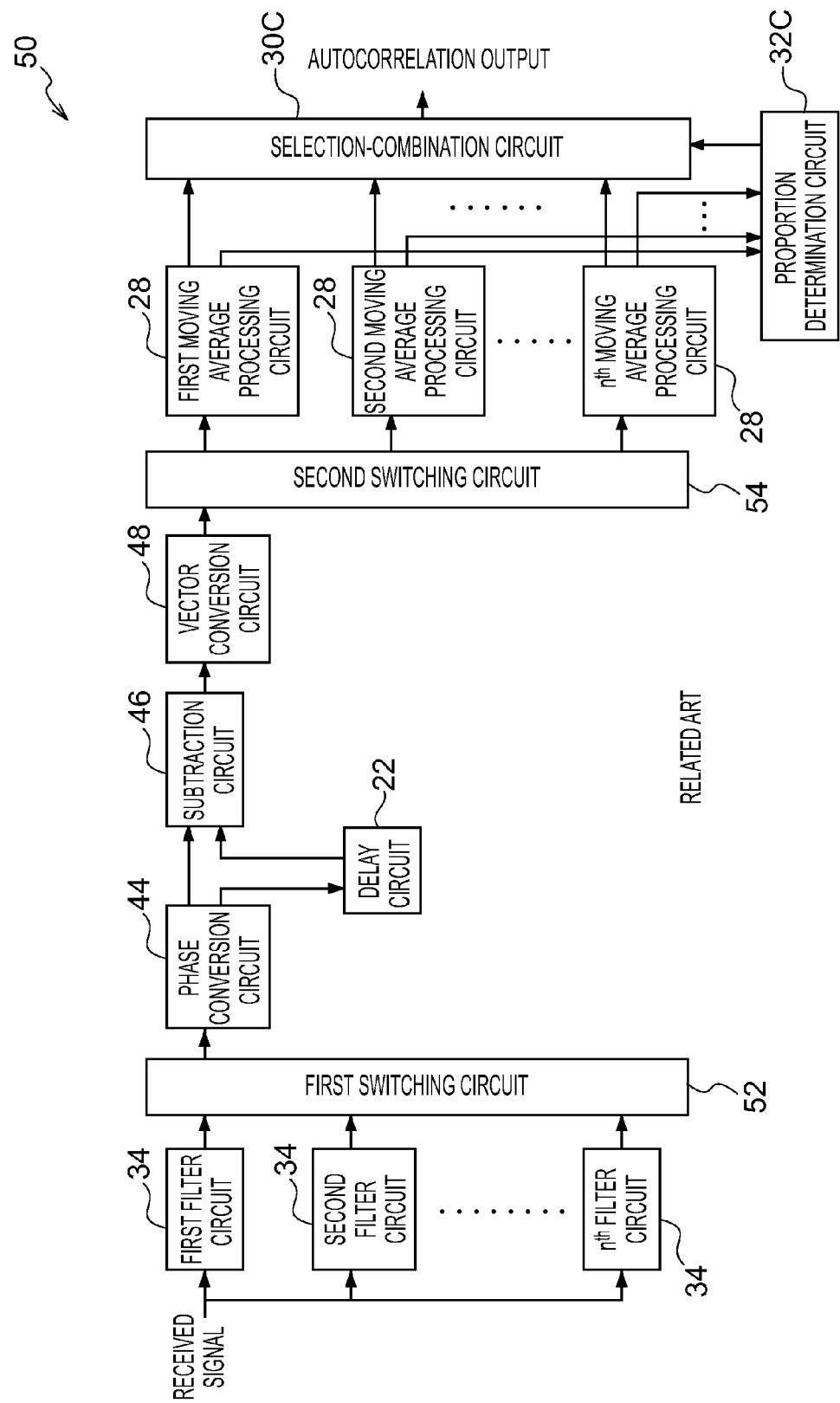
FIG. 8 is a configuration diagram of a correlator of the sixth exemplary embodiment.

FIG. 8 is a diagram illustrating a configuration of a correlator 50 of a sixth exemplary embodiment. The sixth exemplary embodiment, compared to the fifth exemplary embodiment, is a configuration provided with switching circuits provided respectively in front of the respective phase conversion circuits 44 and after the vector conversion circuits 48, in place of the common single-row configuration for the n-row configuration from the phase conversion circuits 44 to the vector conversion circuits 48 of the fifth exemplary embodiment.

Namely, the correlator 50 in the sixth exemplary embodiment includes: first to $n^{th}$ filter circuits 34; a first switching circuit 52; a phase conversion circuit 44; a delay circuit 22; a subtraction circuit 46; a vector conversion circuit 48; a second switching circuit 54; first to $n^{th}$ moving average processing circuits 28; a selection-combination circuit 30C; and a proportion determination circuit 32C.

The OFDM signal output from the A/D conversion section 12 is first input in parallel to the respective first to $n^{th}$ filter circuits 34. After passing through the first to $n^{th}$ filter circuits 34 the OFDM signals are all input to the first switching circuit 52. The output signal from the first switching circuit 52 is input to the phase conversion circuit 44.

The output signal from the phase conversion circuit 44 is input to one of the input terminals of the subtraction circuit 46 and also input to the delay circuit 22. The output terminal of the delay circuit 22 is connected to the other input terminal of the subtraction circuit 46.

The output signal of the subtraction circuit 46 is input to the vector conversion circuit 48. The output signal from the vector conversion circuit 48 is input to the second switching circuit 54. N individual output signals from the second switching circuit 54 are input to the respective of the first to $n^{th}$ moving average processing circuits 28.

The output results from the first to $n^{th}$ moving average processing circuits 28 are respectively input to the selection-combination circuit 30C and also respectively input to the proportion determination circuit 32C. The determination result from the proportion determination circuit 32C is input to the selection-combination circuit 30C. The processing result by the selection-combination circuit 30C is output as the autocorrelation output.

The configuration and operation of the first to $n^{th}$ filter circuits 34 are similar to those of the fifth exemplary embodiment. Similarly, the configuration and operation of the phase conversion circuit 44, the delay circuit 22, the subtraction circuit 46 and the vector conversion circuit 48 are similar to those of their counterparts in the fifth exemplary embodiment. The configuration and operation of the first to $n^{th}$ moving average processing circuits 28 are similar to those in the fifth exemplary embodiment.

The output signal for input to the first switching circuit 52 is switched every cycle (switching period) between each of the output signals of the first to $n^{th}$ filter circuits 34, and the output signal that has been input to the first switching circuit 52 is then output to the phase conversion circuit 44. The second switching circuit 54 is input with the output signal from the vector conversion circuit 48 and switches every cycle (switching period) so as to output respectively to the first to $n^{th}$ filter moving average processing circuits 28. In each of these cycles, the output to the non-selected moving average processing circuits 28 is set at "0".

The relationship between the number of data (equivalent to the OFDM symbol length) Dd data stored in the delay circuit 22 and the number of data Df flowing in each of the filter circuits 34 during each cycle is Df=Dd/M (wherein M is an integer). By maintaining this relationship, the two signals input to the subtraction circuit 46, namely the signal directly input from the phase conversion circuit 44 and the signal input through the delay circuit 22, are always those arising from the same filter circuit 34.

A specific example is given below.

For example consider a case where Dd=1024 and with 8 individual filter circuits 34 provided (namely n=8). In this case by setting Df=128 switching between the 8 filter circuits 34 may be performed in sequence each cycle (M=8).

Next, consider a case where Dd=1024 and with 5 individual filter circuits 34 provided (namely n=5). In this case, simply switching in sequence between the 5 filter circuits 34 does not work. Accordingly, configuration is made such that some of the filter circuits out of the 5 filter circuits 34 are selected twice to give a total of 8 cycles which are then repeated. Consequently, it is possible for M=8 when Df=128 (a case where n≠M). More specifically configuration may be made, for example, such that the first to the fourth cycles correspond to the first to the fourth filter circuits 34, then the third filter circuit 34 is used in the fifth cycle, the fifth filter circuit 34 in the sixth cycle, the third filter circuit 34 in the seventh cycle, and the fourth filter circuit 34 in the eighth cycle.

Note that the basis for selecting particular filter circuits 34 plural times and the basis for the sequence may, for example, be according to the pass-characteristics of each of the filter circuits 34. For example, the number of times a filter circuit is selected may be increased for wide pass-frequency bands, or alternatively the opposite approach may be adopted in which number of times a filter circuit is selected is increased for narrow pass-frequency bands. For terrestrial digital broadcast, analogue broadcast signals are expected to be present in the same channel, and so the number of times a filter circuit is selected may be based on reducing the passage of frequency bands with high power density. However, in general the approach is dependent on the particular characteristics of the individual application system.

From the standpoint that the frequency of selection is different between frequency bands in the above, in the each processing of the proportion determination circuit 32C and the selection-combination circuit 30C weightings are applied to each of the outputs from the first to $n^{th}$ moving average processing circuits 28 according to the frequency of selection of the corresponding filter circuits 34, and then similar processing is performed to that in the fifth exemplary embodiment.

In a case such as the above when n≠M when, for example, there are good reception conditions and no interference signals present and the maximum amplitudes of the autocorrelation obtained by each of the filter circuits 34 are the same as each other, the maximum amplitude of the autocorrelation generated by the third moving average processing circuit 28 corresponding to the third filter circuit 34 that was selected 3 times is about 3 times the maximum amplitude of the autocorrelation corresponding to those filter circuits 34 selected only once, resulting in the autocorrelation corresponding to the third filter circuit 34 becoming more liable to selection. However, weighting is performed as described above so as to avoid biasing in filter circuit selection.

According to the sixth exemplary embodiment as described above, instead of requiring the same number of circuits as the number of filter circuits from the phase conversion circuit 44 to the vector conversion circuit 48, a single of each of the circuits suffices. Similar operation is implemented to that of the fifth exemplary embodiment, and a similar effect is exhibited while greatly reducing circuit scale.

Note that while in the sixth exemplary embodiment explanation is of a case where an improvement is made to give a single common row configuration in the correlator of the fifth exemplary embodiment that first converts the received signal into the phase information, a single common row configuration may be also implemented as an improvement to the fourth exemplary embodiment.

What is claimed is:

1. A correlator comprising:
   a plurality of filter sections having different non-overlapping pass-band characteristics from each other, each of the plurality of filter sections being input in parallel with an Orthogonal Frequency Division Multiplexing (OFDM) signal, which is a single received signal and has been converted to a digital signal, where one symbol period comprises an effective symbol period and a guard interval in which part of the signal of the effective symbol period has been copied, wherein the plurality of filter sections is set such that each of the different non-overlapping pass-band characteristics of filter sections are adjacent to each other;
   a plurality of autocorrelation generating sections, provided so as to correspond to each of the plurality of filter sections, that generate autocorrelation signals based on the signals passed through the corresponding filter sections; and
   an autocorrelation output section that is input with each of the autocorrelation signals and, based on each of the autocorrelation signals, either selects one of the autocorrelations or generates an autocorrelation appropriate for obtaining timing synchronization, and outputs the selected or generated autocorrelation, wherein
   the autocorrelation output section:
   extracts an autocorrelation signal having the largest maximum value from the autocorrelation signals;
   sets a threshold value by multiplying the extracted maximum value by a specific coefficient of less than 1;
   extracts from the remaining autocorrelation signals any autocorrelations having a maximum value greater than the threshold value;
   addition-combines the autocorrelation signal having the largest maximum value and the extracted autocorrelation signals having maximum values greater than the threshold value; and
   outputs the addition-combined autocorrelation signal.

2. The correlator of claim 1, wherein the autocorrelation output section selects and outputs the autocorrelation signal having the largest maximum value from the autocorrelation signals.

3. The correlator of claim 1, wherein the autocorrelation output section:
   extracts any autocorrelation signals having a maximum value greater than a specific threshold value from the autocorrelation signals;
   addition-combines the extracted autocorrelation signals; and
   outputs the addition-combined autocorrelation signal.

4. The correlator of claim 1, wherein each of the plurality of autocorrelation generating sections comprises:
   a delay section that delays the signal output from the corresponding filter section by the effective symbol period;
   a complex conjugate section that takes the complex conjugate of the delay signal from the delay section;
   a complex operation section that is input with the OFDM signal output from the filter section and the signal output from the complex conjugate section after delaying and complex conjugate processing, and that takes the complex-multiplies of the two signals; and
   a moving average processing section that takes a moving average of guard interval length portions of the output from the complex operation section, and that outputs the moving average as an autocorrelation signal.

5. The correlator of claim 1, wherein the autocorrelation output section, when selecting one of the autocorrelations or generating an autocorrelation appropriate for obtaining timing synchronization, applies a weighting to at least one of the signals employed, such that the output is similar to output from employing all the autocorrelation signals generated by the plurality of autocorrelation generating sections even for cases in which the appropriate autocorrelation is generated based on less than all of the autocorrelation signals generated by the plurality of autocorrelation generating sections.

6. The correlator of claim 1 wherein the plurality of filter section is two filter sections and the plurality of autocorrelation generating sections is two autocorrelation generating sections.

7. A correlator comprising:
   a plurality of filter sections having different non-overlapping pass-band characteristics from each other, each of the plurality of filter sections being input in parallel with an Orthogonal Frequency Division Multiplexing (OFDM) signal, which is a single received signal and has been converted to a digital signal, where one symbol period comprises an effective symbol period and a guard interval in which part of the signal of the effective symbol period has been copied; and
   a plurality of autocorrelation generating sections, provided so as to correspond to each of the plurality of filter sections, that generate autocorrelation signals based on the signals passed through the corresponding filter sections,
   wherein each of the plurality of autocorrelation generating sections comprises:
   a phase conversion section that converts the signal output from the corresponding filter section into phase information and that outputs the phase information;
   a delay section that rotates the phase information by the effective symbol period;
   a subtraction section that compares the phase information and the rotated phase information, derives a difference therebetween and outputs the difference as a phase rotation amount;
   a vector conversion section that generates unit vectors from the phase rotation amount; and
   a moving average processing section that takes a moving average of guard interval length portions of the unit vectors and outputs the moving average as an autocorrelation signal.

8. The correlator of claim 7, wherein the configuration from the phase conversion section to the vector conversion section is a single-row configuration, and the correlator further comprises:
   a first switching section, provided after the plurality of filter sections, that switches, every specific cycle, the input to the first switching section between the output signals of the plurality of filter sections, and that outputs the input signal to the phase conversion section; and a second switching section, provided after the vector conversion section, that switches, at the specific cycle, the output signal of the vector conversion section for input to each of the plurality of moving average processing sections.

9. The correlator of claim 8, wherein the relationship between the number of data Dd stored in the delay section, and the number of data Df flowing in each of the filter sections during each specific cycle, is given by Df=Dd/M, wherein M is an integer.

* * * * *